United States Patent
Stueber et al.

(10) Patent No.: US 6,464,129 B2
(45) Date of Patent: Oct. 15, 2002

(54) METHOD OF DIFFUSION BONDING SUPERALLOY COMPONENTS

(75) Inventors: Richard J. Stueber, Paradise Valley, AZ (US); Brenton L. Blanche, Tempe, AZ (US)

(73) Assignee: Triumph Group, Inc., Wayne, PA (US)

( * ) Notice: Subject to any disclaimer, the term of this patent is extended or adjusted under 35 U.S.C. 154(b) by 0 days.

(21) Appl. No.: 09/747,158

(22) Filed: Dec. 22, 2000

(65) Prior Publication Data

US 2002/0104875 A1 Aug. 8, 2002

(51) Int. Cl.$^7$ .............................. B23K 20/02; B23K 1/20
(52) U.S. Cl. ...................... 228/194; 228/206; 228/207
(58) Field of Search ................................ 228/193, 194, 228/195, 201, 202, 205, 206, 208, 207

(56) References Cited

U.S. PATENT DOCUMENTS

| | | | |
|---|---|---|---|
| 3,644,698 A | * | 2/1972 | Metcalfe et al. |
| 4,005,988 A | * | 2/1977 | Paulonis et al. |
| 4,059,217 A | * | 11/1977 | Woodward |
| 4,285,459 A | | 8/1981 | Baladjanian et al. |
| 4,494,287 A | * | 1/1985 | Cruzen et al. |
| 4,507,264 A | | 3/1985 | Stern |
| 4,592,120 A | * | 6/1986 | Egan et al. |
| 4,726,101 A | * | 2/1988 | Draghi et al. |
| 5,156,321 A | * | 10/1992 | Liburdi et al. |
| 5,273,708 A | * | 12/1993 | Freeman |
| 5,318,217 A | * | 6/1994 | Stinson et al. |
| 5,320,690 A | | 6/1994 | Beltran et al. |
| 5,584,428 A | * | 12/1996 | Satoh et al. |
| 5,672,261 A | | 9/1997 | Wheat et al. |
| 5,735,448 A | * | 4/1998 | Draghi et al. |
| 5,822,852 A | | 10/1998 | Bewlay et al. |
| 6,109,505 A | | 8/2000 | Malie et al. |

OTHER PUBLICATIONS

NEMJET (Apr. 1995). (The Ohio State University/Edison Welding Institute).*

* cited by examiner

Primary Examiner—Tom Dunn
Assistant Examiner—Kiley Stoner
(74) Attorney, Agent, or Firm—John D. Titus

(57) ABSTRACT

A method of joining superalloy substrates together comprises diffusion bonding the superalloy substrates by depositing an activator directly on the surface of the joint to be bonded and thereafter subjecting the joint to heat and pressure. The heat and pressure causes the surface of the superalloy, in the presence of the activator, to diffusion bond without the use of a brazing alloy. By eliminating the brazing alloy, a high strength, high temperature bond is achieved, yet there is no molten brazing alloy to be drawn through capillary action into any fine features surrounding the joint being bonded, and there is no residue left at the interface that would diminish the mechanical properties of the joint.

13 Claims, 1 Drawing Sheet

METHOD OF DIFFUSION BONDING SUPERALLOY COMPONENTS

BACKGROUND OF THE INVENTION

The present invention relates to the fabrication and repair of superalloy components, specifically to a method of bonding superalloys at an interface.

Superalloys are employed in articles such as gas turbine hot section components because they exhibit high strength at high temperatures. Typical superalloys are nickel-based superalloys (such as INCONEL 617 and RENE 80) or cobalt-based superalloys (such as X-40 and FSX-414). Iron-based superalloys (such as V-57) are also common Frequently, superalloy components intended for use in gas turbine engines are fabricated as subcomponents that are joined together to form the final engine component. In some cases, the components can be joined by welding, however, in many cases either due to the inaccessibility of the joint to be bonded or the sensitivity of the superalloy microstructure to welding temperatures (such as with gamma prime precipitation hardened alloys), welding is not practicable. Accordingly, numerous diffusion brazing alloys have been developed to permit high strength bonding of these non-weldable components.

Diffusion brazing relies on the solid-state diffusion of atoms across an interface of the joint between the brazing alloy and the base metal. It necessarily follows that the diffusion brazing alloys are formulated to complement the base material of the parts being joined. Diffusion brazing alloys are thus generally nickel, iron, or cobalt-based alloys, depending on the composition of the base metal, combined with one or more melting point depressants such as boron or silicon. Brazing compounds thus have a composition similar to the base alloy but a melting point that is below that of the base metal. Brazing compounds are typically provided in the form of a powder, paste, or thin foil. The bonding of a joint is effected by placing the braze material on the joint and heating the joint to a temperature above the melting point of the brazing alloy but below the incipient melting point of the base alloy. The brazing material is drawn through capillary action into the joint and, upon cooling, forms a strong metallic bond across the joint.

Brazing is not without its disadvantages. Where the parts being joined have small features such as grooves or passages, the brazing alloy often wicks into and partially or completely obstructs these features. For example, the cooling panels in the transition ducts of an advanced high temperature industrial gas turbine have small cross-section cooling passages. The cooling panels are conventionally manufactured by milling a series of channels in a superalloy sheet and brazing a superalloy cover sheet over the milled channels. Conventional process controls have proved ineffectual in preventing the braze alloy from wicking into the cooling passages resulting in a high incidence of rejected parts.

Another disadvantage of brazing is that, because the braze alloy has a lower melting point than the surrounding base material, in extremely high temperature applications, the braze alloy will soften at a temperature lower than that of the surrounding part. The temperature limitation of the braze alloy therefore limits the operating temperature of the whole assembly. Post brazing heat treating improves to some extent the high temperature properties of brazed joints by diffusing the melting point depressants out of the brazed joint and into the surrounding base metal.

What is needed therefore is a method of diffusion bonding superalloy components without the use of brazing alloys.

SUMMARY OF THE INVENTION

The present invention comprises a method of diffusion bonding superalloy substrates by depositing an activator directly on the surface of the joint to be bonded and thereafter subjecting the joint to heat and pressure, which causes the surface of the superalloy, in the presence of the activator, to diffusion bond without the use of a brazing alloy. By eliminating the brazing alloy, a high strength, high temperature bond is achieved, yet there is no molten brazing alloy to be drawn through capillary action into any fine features surrounding the joint being bonded, and there is no residue left at the interface that would diminish the mechanical properties of the joint.

BRIEF DESCRIPTION OF THE DRAWING

The present invention will be better understood from a reading of the following detailed description, taken in conjunction with the accompanying drawing figure, in which.

DETAILED DESCRIPTION

Figure 1:
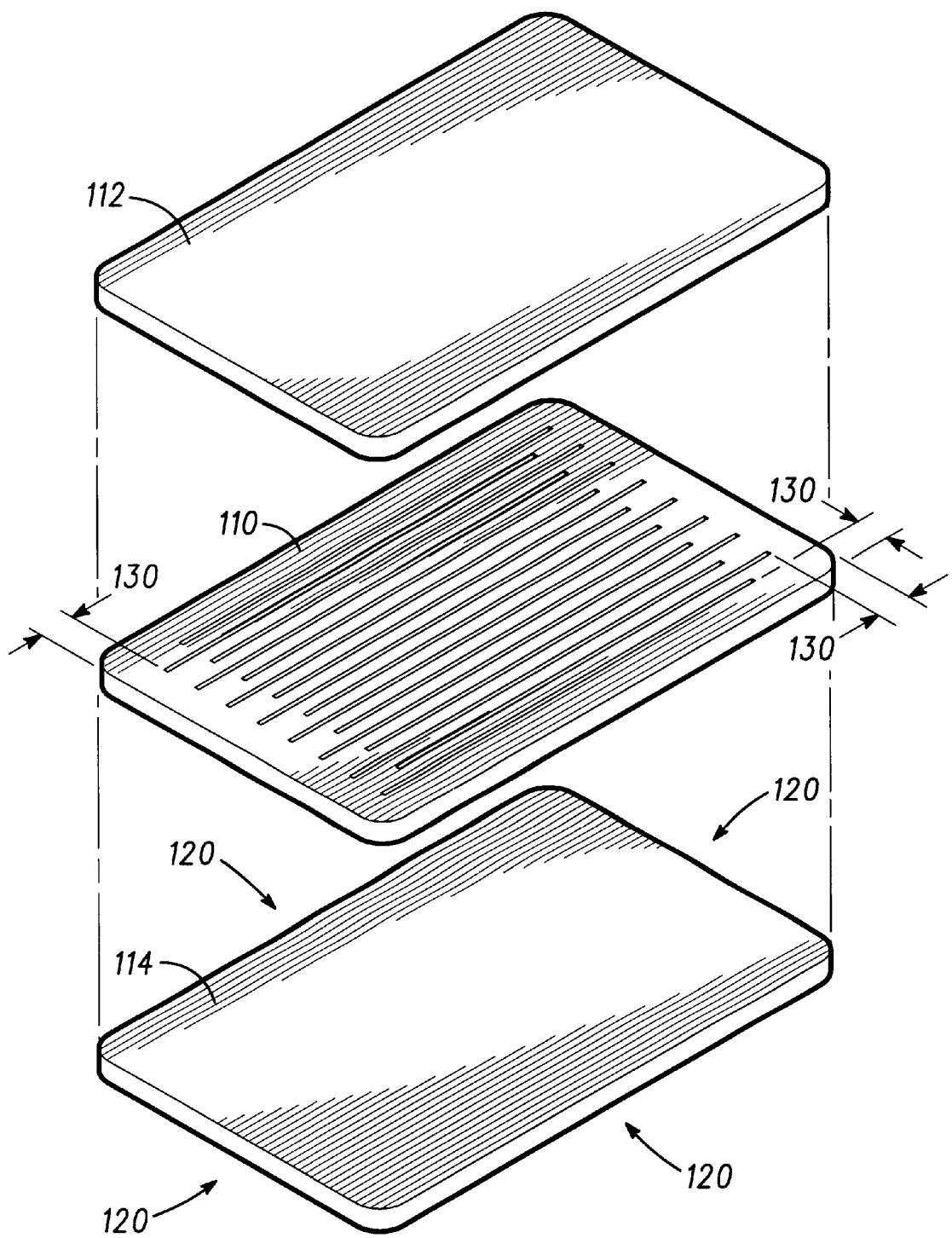
FIG. 1 is an exploded perspective view of a transition duct manufactured according to features of the present invention.

An illustrative embodiment incorporating features of the present invention will be described hereinafter in connection with the fabrication of a panel intended for incorporation into a transition duct that is utilized to convey the hot combustion products from a combuster to the first stage turbine of a gas turbine engine. As shown in FIG. 1, the panel 110 comprises a sheet of rolled nickel-based superalloy INCONEL 617 (obtained from Haynes Stellite) sandwiched between two additional Inconel 617 sheets 112, 114. The center sheet has a series of parallel slots running substantially the entire length of the panel.

It is not necessary that the surfaces of the sheets be finished to a smoothness better than the smoothness of the mill-rolled Inconel sheets, however, smoother surface finishes may be preferable for some applications. Similarly, surface finishes that are rougher than the mill finish of the Haynes Stellite rolled INCONEL sheets may be acceptable for some applications where bond strength is not as critical.

Unlike brazing processes, which are somewhat tolerant of surface oxidation, for best results, diffusion bonding must be carried out with a surface that is substantially oxide-free. In order to ensure that the surfaces of the sheets are free of oxides and other contaminants that would inhibit the diffusion bonding process, the sheets are first cleaned with an organic solvent such as acetone or alcohol to remove any organic contaminants. The sheets are then subjected to a halide ion cleaning process in which the sheets are exposed to a gaseous halide solution, preferably a solution of hydrogen fluoride, most preferably 10% hydrogen fluoride mixed with hydrogen, at an elevated temperature above 1000 degrees Fahrenheit. Preferably the temperature is held above the aging temperature of the superalloy, but below the incipient melting point. Most preferably the temperature is maintained at 1900 degrees Fahrenheit plus or minus 100 degrees Fahrenheit. The panels are exposed to the hydrogen. fluoride environment at elevated temperature for a period of 2–5 hours, preferably about 4 hours, after which the hydrogen fluoride chamber is evacuated along with the by-products of the fluoride cleaning process. This cycle is repeated a second time to ensure that the surfaces of the panel are substantially oxide free.

The fluoride-cleaned panels are then sprayed with an activator material comprising a solution of borane-dimethylamine ($C_2H_{10}NB$) in distilled water. In the illustrative embodiment, three grams of borane-dimethylamine (obtained from Spectrum-Quality Products of Gardenia, Calif. and New Brunswick, N.J.) are dissolved in each liter of water. It is believed by the inventors of the present invention that although boron is a well-recognized melting point depressant for superalloys, the boron contained in the borane-dimethylamine acts as an activator to increase the surface activity of the superalloy substrate when exposed to high temperature, but without inducing any observable melting. Accordingly, any method of applying a thin film of boron, silicon or any other melting point depressant that is substantially free of Iron, Nickel, or Cobalt (the primary constituents of typical superalloy base metals and braze alloys) is considered within the scope of the present invention. By "substantially free" of Iron, Nickel, or Cobalt, what is meant herein is that neither Iron, Nickel, nor Cobalt is present in sufficient quantity to act as a filler to wick into the gaps between the mating surfaces of the surfaces being joined. Instead, the base material itself forms the joint without any filler.

In addition to organic amines, other organic carriers (containing carbon, small amounts of which can diffuse into the superalloy substrate without deleterious effects, and hydrogen, which is easily driven off during the hot isostatic pressing step described hereinafter) would be suitable as a delivery mechanism for depositing the boron on the surface of the substrate. The organic carrier should, however, be relatively free of oxygen because oxygen, in sufficient quantity, will tend to form oxides of the superalloy thus inhibiting the diffusion bonding process. Additionally, although boron is preferable, other melting point depressants such as silicon would be acceptable surface activators. Boron is preferred, however, because silicon is known to have an adverse effect on the mechanical properties of the superalloy substrate.

In the illustrative embodiment, the solution of borane-dimethylamine is sprayed onto the surface of the panels with an ordinary hand-operated spray bottle until the surfaces are thoroughly wet. The panels are allowed to drip dry, after which the panels are again sprayed with the borane-dimethylamine solution. Once dried, a thin, somewhat irregular residue of borane-dimethylamine (between a few microns to about 20–50 microns, but less than 0.001 inch) remains on the surface of the panels to act as a diffusion bonding activator. Although spraying is preferred in order to minimize waste of the activator solution, other methods of applying the borane-dimethylamine solution, such as dipping the panels in a tank of borane-dimethylamine solution, or electrostatic fogging, are considered within the scope of the present invention.

In the illustrative embodiment, in order to apply a uniform load over the entire surface being bonded without distorting the panels, the diffusion bonding process takes place within a hot isostatic press. Accordingly, prior to the hot isostatic pressing operation, the perimeters of the three panels forming the assembly are welded together along the perimeter 120 to form a sealed chamber. The panels are welded in an inert environment (such as argon), or in a vacuum, so as to ensure that little or no oxygen is trapped inside the panel assembly to inhibit the diffusion bonding process. The perimeter welding may be effected by any conventional welding method such as tungsten inert gas (TIG), electron beam welding or other conventional welding technique used with high temperature superalloys. A sufficient margin 130 is provided around perimeter 120 of each of the panels such that the microstructure of the panel in its final form will not have had its microstructure affected by the welding process.

The welded panel assembly is diffusion bonded by subjecting the assembly to a temperature of 2040 degrees Fahrenheit plus or minus 25 degrees Fahrenheit at a pressure of 1000 to 1050 PSI for a period of 30 to 35 minutes in a hot isostatic press, after which the panels are cooled. The hot isostatic press provides sufficient pressure to force the joint together (obviating the need for a braze alloy to act as a filler) while elevating the temperature to raise the activity of the surface such that, in the presence of the activator, the molecules of the base material interdiffuse. Although the illustrative embodiment is diffusion bonded at 2040 degrees Fahrenheit, any elevated temperature above the temperature at which molecular diffusion occurs (the activation temperature) up to the incipient melting point of the superalloy substrate would be acceptable so long as the part is not distorted by the pressure at the elevated temperature and the mechanical properties of the superalloy are not degraded (thorough grain boundary growth or otherwise). Preferably, to avoid over-aging the superalloy substrate, the diffusion bonding process should be carried out at a temperature above the aging temperature of the base alloy. Most preferably, the process is carried out between 1750 to 2200 degrees Fahrenheit.

Additionally, pressures greater or less than 1000 PSI may be appropriate depending upon the surface area of the parts being bonded as well as the bonding temperature. In some cases, for example where the mating surfaces of the parts are sufficiently smooth and the parts are sufficiently massive that the pressure on the joint being bonded can be supplied by the weight of the part itself, heating of the joint in an inert environment may be sufficient to cause the diffusion bonding process to occur without the application of external pressure. Accordingly, any method of applying pressure to the joint while held at an elevated temperature in an inert environment is considered within the scope of the present invention.

In the illustrative embodiment, the diffusion bonded panels are removed from the hot isostatic press and finished to the appropriate final dimensions by removing the perimeter weld and margin 120 adjacent the perimeter weld by wire EDM or other conventional machining process. During processing, once the panels have been subjected to the halide ion cleaning, they are handled with powderless latex gloves and sealed in plastic bags to avoid contamination, until after the perimeter welding has been completed.

Although certain illustrative embodiments and methods have been discussed herein, it will be apparent from the foregoing disclosure to those skilled in the art that variations and modifications of such embodiments and methods may be made without departing from the spirit and scope of the invention. Accordingly, it is intended that the invention shall be limited only to the extent required by the appended claims and the rules and principles of applicable law.

What is claimed is:

1. A method of bonding a first article formed of a superalloy material to a second article also formed of a superalloy material comprising:

cleaning a surface of said first article;

cleaning a surface of said second article;

applying an activator material to said surface of said first article, said activator material comprising a melting point depressant mixed with a carrier material that is substantially free of Nickel, Cobalt and Iron;

bringing said surface of said first article in contact with said surface of said second article at an interface;

applying a load at said interface to force said surface of said first article and said surface of said second article together; and heating said interface in an inert atmosphere.

2. The method of claim 1, further comprising:

applying said activator material to said surface of said second article.

3. The method of claim 1, wherein:

said melting point depressant is a material chosen from the group consisting of boron and silicon.

4. The method f claim 1, wherein:

said melting point depressant is an organic boron compound.

5. The method of claim 4, wherein:

said activator material is an amine containing boron.

6. The method of claim 5, wherein:

said activator material is borane-dimethylamine.

7. The method of claim 1, wherein:

said activator material is an organic silicon compound.

8. The method of claim 1, wherein:

said activator material is a solution containing a melting point depressant dissolved in a liquid.

9. The method of claim 1, wherein:

The step of cleaning a surface of said first article comprises exposing said surface to a halide ion gas.

10. The method of claim 1, wherein:

The step of applying a load at said interface comprises exposing said first article and said second article to at least atmospheric pressure and the step of heating said interface comprises heating said interface to a temperature above the activation temperature of said interface.

11. The method of claim 10, wherein:

said temperature is above the aging temperature and below the incipient melting point of said superalloy material.

12. The method of claim 10, wherein:

said temperature is between 1750–2200 degrees F.

13. The method of claim 10, further comprising:

exposing said first article and said second article to a pressure of at least 100 psi.

* * * * *